United States Patent
Lee et al.

(10) Patent No.: US 10,449,753 B2
(45) Date of Patent: Oct. 22, 2019

(54) METHOD FOR MANUFACTURING TRANSPARENT COMPOSITE MATERIAL

(71) Applicant: LG Electronics Inc., Seoul (KR)

(72) Inventors: Jongwon Lee, Seoul (KR); Kyungho Jung, Yongin-Si (KR); Deokhai Park, Seoul (KR); Eunseck Kang, Hwaseong-Si (KR)

(73) Assignee: LG ELECTRONICS INC., Seoul (KR)

( * ) Notice: Subject to any disclaimer, the term of this patent is extended or adjusted under 35 U.S.C. 154(b) by 500 days.

(21) Appl. No.: 14/663,076

(22) Filed: Mar. 19, 2015

(65) Prior Publication Data
US 2015/0190992 A1   Jul. 9, 2015

Related U.S. Application Data

(62) Division of application No. 13/587,627, filed on Aug. 16, 2012, now Pat. No. 9,028,945.

(30) Foreign Application Priority Data

Apr. 23, 2012   (KR) .................. 10-2012-0042269

(51) Int. Cl.
*B32B 37/02* (2006.01)
*B32B 5/12* (2006.01)
(Continued)

(52) U.S. Cl.
CPC ............ *B32B 37/02* (2013.01); *B29C 70/202* (2013.01); *B29C 70/34* (2013.01); *B32B 5/12* (2013.01); *B32B 5/26* (2013.01); *B32B 17/04* (2013.01); *B32B 37/06* (2013.01); *B32B 38/004* (2013.01); *B32B 38/1816* (2013.01); *B29K 2995/0026* (2013.01); *B32B 2262/101* (2013.01); *B32B 2305/08* (2013.01); *B32B 2305/10* (2013.01); *B32B 2307/412* (2013.01); *B32B 2309/02* (2013.01); *B32B 2383/00* (2013.01);
(Continued)

(58) Field of Classification Search
None
See application file for complete search history.

(56) References Cited

U.S. PATENT DOCUMENTS 3,133,773 A    5/1964 Ecker
5,387,301 A *  2/1995 Miyao .................... B29C 70/50
                                                        156/176

(Continued)

FOREIGN PATENT DOCUMENTS

KR   10-2005-0075407 A   7/2005
KR   10-2008-0005950 A   1/2008
KR   10-2010-0083697 A   7/2010

OTHER PUBLICATIONS

Korean Patent 1-2005-7008609 translation. Aug. 21, 2017.*

*Primary Examiner* — Barbara J Musser
(74) *Attorney, Agent, or Firm* — Birch, Stewart, Kolasch & Birch, LLP

(57) ABSTRACT

A method for manufacturing a transparent composite material including preparing a film coated with a transparent resin, unidirectionally aligning glass fiber filaments and manufacturing a glass fiber plate by embedding the unidirectionally aligned glass fiber filaments in the transparent resin, wherein the transparent resin includes Si—O—Si bond and one of methyl, ethyl and phenyl.

5 Claims, 2 Drawing Sheets

(51) Int. Cl.
    *B32B 5/26*         (2006.01)
    *B32B 37/06*       (2006.01)
    *B29C 70/34*       (2006.01)
    *B29C 70/20*       (2006.01)
    *B32B 17/04*       (2006.01)
    *B32B 38/18*       (2006.01)
    *B32B 38/00*       (2006.01)

(52) U.S. Cl.
    CPC ... *B32B 2551/00* (2013.01); *Y10T 428/24058* (2015.01); *Y10T 428/24124* (2015.01); *Y10T 428/249921* (2015.04)

(56) References Cited

U.S. PATENT DOCUMENTS

| | | | |
|---|---|---|---|
| 5,449,560 A * | 9/1995 | Antheunis | B32B 17/10036 428/447 |
| 2012/0251750 A1* | 10/2012 | Sybert | C08L 83/10 428/35.7 |
| 2013/0101762 A1* | 4/2013 | Malis | B29C 70/34 428/34.1 |

\* cited by examiner

|  | CLOTH FORM | UNIDIRECTIONALLY ALIGNED FORM |
|---|---|---|
| IMPACT STRENGTH (IZOD, kg.cm/cm) | 62 | 87 |
| THNSILE STRENGTH(MPa) | 570 | 927 |
| TENSILE MODULUS(GPa) | 21 | 30 |
| FLEXURAL STRENGTH(MPa) | 650 | 930 |
| FLEXURAL MODULUS(GPa) | 20 | 34 |
| LIGHT TRANSMITTANCE(%) | 85 | 90 |
| Haze(%) | 6 | 3 |

METHOD FOR MANUFACTURING TRANSPARENT COMPOSITE MATERIAL

CROSS-REFERENCE TO RELATED APPLICATIONS

This application is a divisional of U.S. application Ser. No. 13/587,627 filed on Aug. 16, 2012, now U.S. Pat. No. 9,028,945 which claims the benefit of earlier filing date and right of priority to Korean Application No. 10-2012-0042269, filed on Apr. 23, 2012. The contents of all of these applications are hereby incorporated by reference as fully set forth herein in their entirety.

BACKGROUND OF THE INVENTION

Field of the Invention

This specification relates to a transparent composite material and a method and apparatus for manufacturing the same.

Discussion of the Related Art

In general, glass or plastic is often used as a transparent (colorless) material. However, the glass breaks easily and the plastic is weak in strength. Accordingly, development of a transparent composite material is ongoing. A transparent composite material according to the related art has been manufactured by embedding (immersing) glass fibers into a typical resin. However, the glass fiber and the typical resin exhibit a great difference in view of a rate of change in a refractive index. This may cause light transmittance to easily change according to a change in temperature.

SUMMARY OF THE INVENTION

To achieve these and other advantages and in accordance with the purpose of this specification, as embodied and broadly described herein, there is provided a transparent composite material composed of a glass fiber plate including a transparent resin, and a plurality of glass fiber filaments embedded in the transparent resin in a unidirectionally aligned state.

In one aspect of the present disclosure, the transparent composite material may include the glass fiber plate in plurality, and the plurality of glass fiber plates may be stacked such that the glass fiber filaments of each glass fiber plate intersect with each other by different angles.

In one aspect of the present disclosure, the intersecting angle of the glass fiber filaments of the stacked glass fiber plates may be 45° or 90°.

In one aspect of the present disclosure, the plurality of glass fiber plates may include a first glass fiber plate having the glass fiber filaments unidirectionally embedded therein, and a second glass fiber plate having the glass fiber filaments unidirectionally embedded therein. Here, the second glass fiber plate may be stacked on the first glass fiber plate such that the glass fiber filaments of the second glass fiber plate form the intersecting angle of 90° with the glass fiber filaments of the first glass fiber plate.

In one aspect of the present disclosure, the glass fiber filaments of two sheets of glass fiber plates, which are stacked on both surfaces of one glass fiber plate of the plurality of glass fiber plates, may have the same intersecting angle with each other.

In one aspect of the present disclosure, the glass fiber filaments may be embedded in the transparent resin without intersecting or overlapping with each other.

In one aspect of the present disclosure, the glass fiber filaments may be embedded in the transparent resin to be adjacent to each other on the same plane or to contact each other on the same plane.

In one aspect of the present disclosure, the transparent resin may be an inorganic-organic hybrid resin composed of inorganic bonds and organic bonds.

In one aspect of the present disclosure, the inorganic bond contained in the inorganic-organic hybrid resin may be Si—O—Si bond, and a rate of the Si—O—Si bond may be in the range of 30% to 60%. Also, the organic bond contained in the inorganic-organic hybrid resin may be one of methyl, ethyl and phenyl or a combination thereof, and a rate of the organic bond may be less than 70% or in the range of 40% to 60%.

In one aspect of the present disclosure, the transparent resin may be coated on a film.

To achieve these and other advantages and in accordance with the purpose of this specification, as embodied and broadly described herein, there is provided a method for manufacturing a transparent composite material including preparing a film coated with a transparent resin, unidirectionally aligning glass fiber filaments, and manufacturing a glass fiber plate by embedding the unidirectionally aligned glass fiber filaments in the transparent resin.

To achieve these and other advantages and in accordance with the purpose of this specification, as embodied and broadly described herein, there is provided an apparatus for manufacturing a transparent composite material including a glass fiber supplier to supply glass fiber filaments, a spreading unit to unidirectionally spread (align) the glass fiber filaments in a non-intersecting or overlapping manner, a resin film supplier to supply a film having a resin thereon, a glass fiber plate manufacturing unit to manufacture a glass fiber plate by heat-pressing the aligned glass fiber filaments onto the resin formed on the film, and a glass fiber plate collecting unit to collect the manufactured glass fiber plate.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
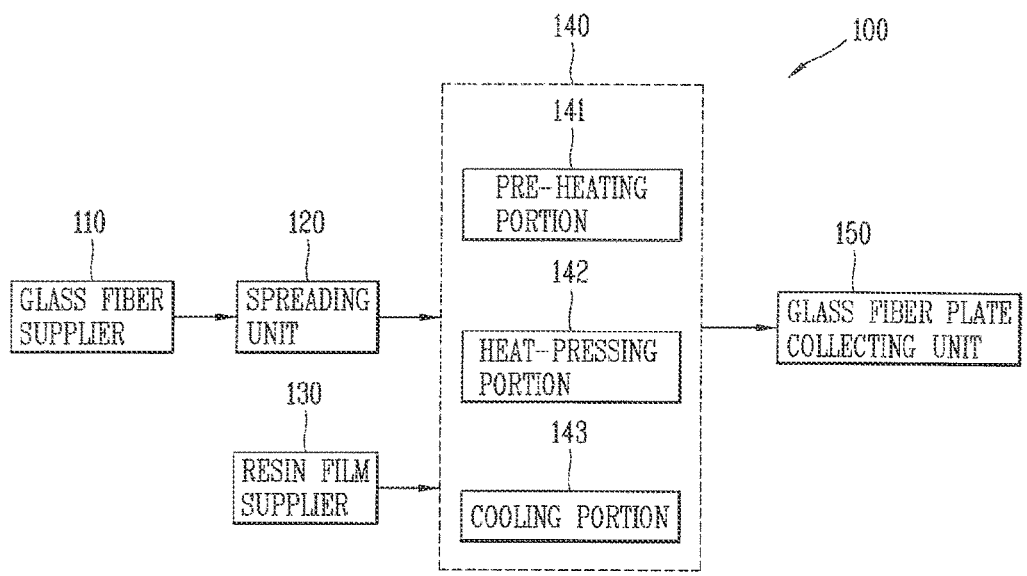
FIG. 1 is a view showing a configuration of an apparatus for manufacturing a transparent composite material in accordance with an exemplary embodiment of this specification.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Hereinafter, suffixes "module" and "unit or portion" for components used herein in description are merely provided only for facilitation of preparing this specification, and thus they are not granted a specific meaning or function.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present invention will be described below in detail with reference to the accompanying drawings, where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Hereinafter, description will be given, with reference to FIGS. 1 to 4, of a transparent composite material, capable of exhibiting relatively high light transmittance, reduced haze, fabrication in the form of a thin film, and improved mechanical strengths (impact strength, flexural strength, etc.), by way of unidirectionally aligning glass fiber filaments without intersecting or overlapping with each other, and embedding the aligned glass fiber filaments into a transparent resin formed on a film, and a manufacturing method thereof.

A transparent composite material according to exemplary embodiments of the present disclosure may be applicable to a variety of display panels, such as a Liquid Crystal Display (LCD), a display panel of an Organic Light Emitting Diode (OLED), a Plasma Display Panel (PDP), a display panel of a Field Emitting Display (FED) and the like. Also, the transparent composite material according to the exemplary embodiments of the present disclosure may be used as a flexible substrate, an optical substrate (e.g., solar cell, etc.), a glass substitute material and the like.

In general, a transparent composite material is fabricated by embedding a glass cloth in a resin, which has the same refractive index as a glass fiber. However, upon applying the glass fibers in the form of cloth, the glass fibers are twisted with each other. Hence, an intersected or overlapped portion of the glass fibers is wider in width and exhibits a non-uniform directivity of glass fiber filaments. Consequently, when such glass fibers are embedded in a transparent resin, an embedding rate is lowered, a light transmittance is lowered due to light dispersion, and an overall haze increases.

Therefore, a transparent composite material and a manufacturing method thereof according to the exemplary embodiment of the present disclosure may provide excellent optical characteristics (high light transmittance and low haze) by unidirectionally aligning the glass fiber filaments in a non-twisted state (i.e., without intersecting or overlapping each other) when embedding the glass fiber filaments into the transparent resin formed on a film (or transparent substrate).

FIG. 1 is a view showing a configuration of an apparatus for manufacturing a transparent composite material in accordance with an exemplary embodiment of this specification.

As shown in FIG. 1, an apparatus 100 for manufacturing a transparent composite material may include a glass fiber supplier 110 which supplies glass fibers (glass fiber filaments), a spreading (opening) unit to allows glass fibers (glass fiber filaments) supplied from the glass fiber supplier 110 to be spread (opened, aligned) in one direction without intersecting or overlapping with each other, a resin film supplier 130 to provide a film (resin film) having a resin (transparent resin) formed (coated) thereon, a fiber plate manufacturing unit 140 to manufacture a glass fiber plate by heat-pressing the aligned glass fibers onto the resin formed on the film, and a glass fiber plate collecting unit 150 (for example, a roller) to collect (roll up) the glass fiber plate.

The glass fiber supplier 110 may include a plurality of skeins wound with the glass fiber filaments, and each skein may continuously supply a strand of glass fiber filament to the spreading unit 120.

The spreading unit 120 may then unidirectionally align the glass fiber filament supplied from each skein so as not to intersect or overlap with each other, and supply the glass fiber filaments, which have been aligned without intersecting or overlapping with each other, to the glass fiber plate manufacturing unit 140.

The resin film supplier 130 may provide the glass fiber plate manufacturing unit 140 with a protection film for protecting the film and the glass fibers when heat-pressing the aligned glass fibers on the resin formed on the film (a transparent resin coated on the surface of the film). The protection film may be located on the glass fibers formed (embedded) in the resin.

The resin film supplier 130 may supply a transparent resin formed in the form of film to the glass fiber plate manufacturing unit 140. The glass fiber plate manufacturing unit 140 may heat-press the glass fiber filaments onto the transparent resin, which is formed in the form of film, thereby manufacturing the glass fiber plate.

The glass fiber plate manufacturing unit 140 may manufacture the glass fiber plate by heat-pressing the glass fiber filaments, which have been unidirectionally aligned not to intersect or overlap with each other, onto the resin coated on the film.

The glass fiber plate manufacturing unit 140 may include a pre-heating portion 141 to generate heat for heat-pressing the aligned glass fibers onto the resin formed on the film, and a cooling portion 143 to cool the glass fiber plate manufactured by heat-pressing the aligned glass fibers onto the resin formed on the film. The pre-heating portion 141 may be a heater.

The glass fiber plate manufacturing unit 140 may further include a cutting portion (not shown) to cut the glass fiber plate into a preset size.

The apparatus 100 for manufacturing the transparent composite material may further include a recovery unit (not shown) (for example, roller) to recover (roll up) the protection film applied onto the glass fiber plate after manufacturing the glass fiber plate.

The glass fiber plate collecting unit 150 may be a roller which rolls up the glass fiber plate.

Hereinafter, description will be given of a method for manufacturing a transparent composite material using the apparatus 100 for manufacturing the transparent composite material according to an exemplary embodiment, with reference to FIGS. 1 to 4.

Figure 2:
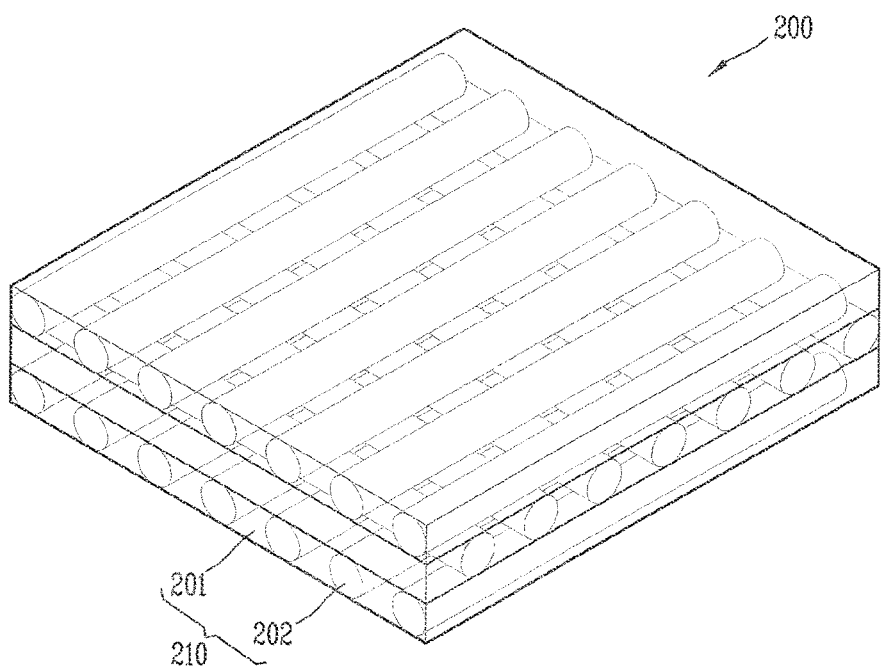
FIG. 2 is an enlarged view schematically showing a transparent composite material in accordance with an exemplary embodiment of this specification.

FIG. 2 is an enlarged view schematically showing a transparent composite material in accordance with an exemplary embodiment of this specification.

As shown in FIG. 2, a transparent composite material 200 in accordance with an exemplary embodiment may include a resin (transparent resin) 210 formed on a film, and glass fiber filaments 202 unidirectionally aligned in a non-intersecting or overlapping manner. Here, a plurality of glass fiber plates (prepregs) 210 including the resin 201 and the glass fiber filaments 202 may be stacked by different intersecting angles. For instance, when a second glass fiber plate is stacked on a first glass fiber plate and a third glass fiber plate is stacked on the second glass fiber plate, an intersecting angle between the glass fiber filaments of the second glass fiber plate and the glass fiber filaments of the first glass fiber plate may be 90° or 45°, and an intersecting angle between the glass fiber filaments of the third glass fiber plate and the glass fiber filaments of the second glass fiber plate may be 90° or 45°. That is, the glass fiber filaments of two sheets of glass fiber plates, which are stacked on both surfaces of one glass fiber plate of the plurality of glass fiber plates, may intersect with each other by the same angle. Also, the glass fiber filaments of one glass fiber plate of the plurality of glass fiber plates and the glass fiber filaments of another glass fiber plate stacked on the one glass fiber plate may intersect with each other by a different angle.

The intersecting angle between the glass fiber plates may depend on a designer's intension.

The glass fiber filaments 202 may be embedded (immersed) in the resin (transparent resin) 201 formed on the film so as to be adjacent to each other on the same plane or to contact each other on the same plane.

The glass fiber filaments 202 may be aligned unidirectionally such that the glass fiber filaments 202 cannot intersect or overlap with each other, and the aligned glass fiber filaments 202 may be embedded in the transparent resin 201 formed on the film. This may result in exhibiting relatively high light transmittance, reducing haze, manufacturing in the form of a thin film, and improving mechanical strengths (impact strength, flexural strength, etc.).

Inorganic-organic hybrid materials may be used as the transparent resin 201 contained in the transparent composite material. The inorganic-organic hybrid materials may be fabricated by a Sol-Gel method, which includes a hydrolysis process and a condensation reaction process, by reacting organohalogenosilane with silicon alkoxide or alkylether, or by a non-hydrolytic reaction without use of water.

In order to maintain transparency of the transparent composite material (transparent film or glass fiber plate) within a wide temperature range, a thermooptic coefficient of the inorganic-organic hybrid resin (inorganic-organic hybrid resin having a low thermooptic coefficient) contained in the transparent composite material may be adjusted into the range of $-5\times10^{-5}/°$ C.$\sim+10^{-5}/°$ C. by adjusting a rate of an inorganic coupling (bonding) (e.g., Si—O—Si bonds) and an organic coupling within the inorganic-organic hybrid resin.

When the thermooptic coefficients of the inorganic-organic hybrid resin and the resin fiber are close to each other, a difference of refractive index due to the change in temperature may be reduced. This may allow for use of the transparent composite material within a wide temperature range.

In order to adjust the thermooptic coefficient of the inorganic-organic hybrid resin to $-5\times10^{-5}/°$ C.$\sim+10^{-5}/°$ C., if it is assumed that the inorganic-organic hybrid resin is 100%, a rate of the inorganic bonds (e.g., Si—O—Si bonds) within the inorganic-organic hybrid resin may be more than 30% or in the range of 40~60%. Here, a rate of the organic bonds within the inorganic-organic hybrid resin may be less than 70% or in the range of 40~60%. The organic bond may be one of methyl (—$CH^3$), ethyl (—$C^2H^5$), phenyl (—$C^6H^5$) and the like, or a combination thereof.

Figures 3, 4:
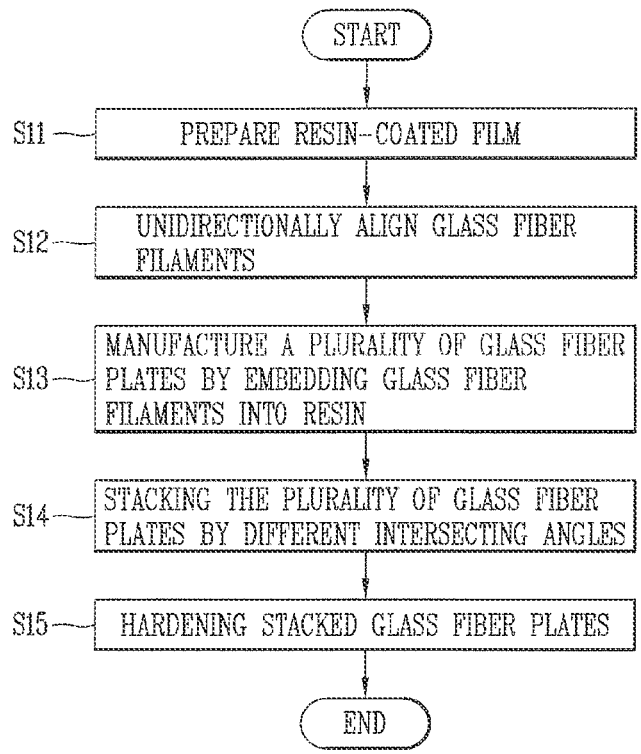
FIG. 3 is a flowchart showing a method for manufacturing a transparent composite material in accordance with an exemplary embodiment of this specification.
FIG. 4 is a table showing characteristic comparison results between the transparent composite material accord-

FIG. 3 is a flowchart showing a method for manufacturing a transparent composite material in accordance with an exemplary embodiment of this specification.

First, a film coated with a resin (transparent resin) 201 is fabricated (S11). The resin (transparent resin) 201 may be the inorganic-organic hybrid resin.

The resin film supplier 130 supplies the resin-coated film to the glass fiber plate manufacturing unit 140.

The glass fiber filaments 202 are unidirectionally aligned in a non-intersecting or overlapping manner (S12). For example, the spreading unit 120 unidirectionally aligns the glass fiber filaments supplied from each skein not to intersect or overlap each other.

The glass fiber filaments 202 may be aligned to be adjacent to each other on the same plane or to contact each other on the same plane. Prior to aligning the glass fiber filaments 202, surfaces of the glass fiber filaments 202 may be processed through a general surface processing. For example, the surfaces of the glass fiber filaments 202 may be processed to be embedded in the inorganic-organic hybrid resin.

The unidirectionally aligned glass fiber filaments 202 are embedded in the resin (transparent resin) 201, thereby fabricating the plurality of glass fiber plates (or films) (S13). For example, the glass fiber plate manufacturing unit 140 manufactures the glass fiber plates by heat-pressing the glass fiber filaments 202, which have been unidirectionally aligned in the non-intersecting or overlapping manner, onto the resin coated on the film. That is, the glass fiber plate manufacturing unit 140 embeds the glass fiber filaments 202, which are in an evenly aligned (spread, opened) state, in the resin 201 through heat-pressing, thereby producing the plurality of glass fiber plates (or films).

The plurality of glass fiber plates 210 are stacked by each other by different intersecting angles (S14). For instance, when a second glass fiber plate is stacked on a first glass fiber plate and a third glass fiber plate is stacked on the second glass fiber plate, an intersecting angle between the glass fiber filaments of the second glass fiber plate and the glass fiber filaments of the first glass fiber plate may be 90° or 45°, and an intersecting angle between the glass fiber filaments of the third glass fiber plate and the glass fiber filaments of the second glass fiber plate may be 90° or 45°. The intersecting angles of the glass fiber plates may depend on a designer's intension. The glass fiber plates may be stacked in various directions to minimize a stress of the glass fiber plates.

The stacked glass fiber plates are hardened (integrated) by use of a heat-pressing method or an autoclave method, thereby manufacturing the transparent composite material 100 (S15).

FIG. 4 is a table showing characteristic comparison results between the transparent composite material according to the exemplary embodiment of this specification and the related art transparent composite material.

The transparent composite material according to the exemplary embodiment of the present disclosure includes the glass fiber filaments, which are unidirectionally aligned in the non-intersecting or overlapping with each other, whereas the related art transparent composite material includes glass fiber filaments in the form of cloth.

As shown in FIG. 4, an impact strength (kg·cm/cm) of the related art transparent composite material is 62 kg·cm/cm, whereas the impact strength (kg·cm/cm) of the transparent composite material of the present disclosure is 87 kg·cm/cm. This may indicate that the transparent composite material of the present disclosure exhibits the more improved impact strength than the related art transparent composite material.

A tensile strength (MPa) of the related art transparent composite material is 570 MPa, whereas the tensile strength (MPa) of the transparent composite material according to the present disclosure is 927 MPa. This may indicate that the transparent composite material according to the exemplary embodiment of the present disclosure exhibits the more improved tensile strength than the related art transparent composite material.

A tensile modulus (GPa) of the related art transparent composite material is 21 GPa, whereas the tensile modulus (GPa) of the transparent composite material according to the exemplary embodiment of the present disclosure is 30 GPa. This may indicate that the transparent composite material according to the exemplary embodiment exhibits the more improved tensile modulus than the related art transparent composite material.

A flexural strength (MPa) of the related art transparent composite material is 650 MPa, whereas the flexural strength (MPa) of the transparent composite material according to the exemplary embodiment is 930 MPa. This may indicate that the transparent composite material according to the exemplary embodiment of the present disclosure exhibits the more improved flexural strength than the related art transparent composite material.

A flexural modulus (GPa) of the related art transparent composite material is 20 GPa, whereas the transparent composite material according to the exemplary embodiment of the present disclosure is 34 GPa. This may indicate that the transparent composite material according to the exemplary embodiment exhibits the more improved flexural modulus than the related art transparent composite material.

A light transmittance (%) of the related art transparent composite material is 85%, whereas the light transmittance (%) of the transparent composite material according to the exemplary embodiment is 90%. This may indicate that the transparent composite material according to the exemplary embodiment exhibits the more improved light transmittance than the related art transparent composite material.

A haze (%) of the related art transparent composite material is 6%, whereas the haze (%) of the transparent composite material according to the exemplary embodiment is 3%. This may indicate that the transparent composite material according to the exemplary embodiment exhibits the more reduced haze than the related art transparent composite material.

As described above, in accordance with a transparent composite material and a manufacturing method thereof according to the exemplary embodiments, glass fiber filaments may be unidirectionally aligned without intersecting or overlapping with each other and then embedded in a transparent resin formed on a film. This may result in exhibiting relatively high light transmittance, reduced haze, fabrication in the form of a thin film, and improved mechanical strengths (impact strength, flexural strength, etc.)

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for manufacturing a transparent composite material composed of a glass fiber plate, comprising:
preparing a film coated with a transparent resin;
processing surfaces of glass fiber filaments;
unidirectionally aligning the glass fiber filaments in a non-intersecting manner;
manufacturing a plurality of glass fiber plates by embedding the unidirectionally aligned glass fiber filaments in the transparent resin formed on the film by heat pressing the unidirectionally aligned glass fiber filaments onto the transparent resin;
cooling the plurality of glass fiber plates manufactured by the heat pressing;
stacking the plurality of glass fiber plates on each other by different overlapping angles of the glass fiber filaments, wherein glass fiber filaments of a first glass fiber plate stacked on a top surface of a second glass fiber plate overlap the glass fiber filaments of the second glass fiber plate at a first angle, and glass fiber filaments of a third glass fiber plate stacked on a bottom surface of the second glass fiber plate overlap the glass fiber filaments of the second glass fiber plate at the first angle; and hardening the stacked glass fiber plates by use of a heat-pressing method or an autoclave method, wherein the transparent resin includes Si—O—Si bonds and one of methyl, ethyl and phenyl, wherein the transparent resin is an inorganic-organic hybrid resin composed of inorganic bonds and organic bonds fabricated by a Sol-Gel method which includes a hydrolysis process and a condensation reaction process, wherein the organic bonds contained in the inorganic-organic hybrid resin are one of methyl(—$CH^3$), ethyl (—$C^2H^5$), phenyl(—$C^6H^5$), or a combination thereof, wherein the inorganic bonds contained in the inorganic-organic hybrid resin are the Si—O—Si bonds, wherein a rate of the Si—O—Si bonds is in a range of 30% to 60%, and a rate of the organic bonds is in a range of 40% to 70%, and wherein the stacking of the plurality of glass fiber plates is performed to stack the plurality of glass fiber plates such that the first angle is 45°.

2. The method of claim 1, further comprising:
cutting the plurality of glass fiber plates.

3. The method of claim 1, wherein the glass fiber filaments of the first glass fiber plate and the third glass fiber plate extend in a same direction.

4. The method of claim 1, wherein the glass fiber filaments are embedded in the transparent resin without overlapping with each other.

5. The method of claim 1, wherein a thermooptic coefficient of the inorganic-organic hybrid resin is in a range of $-5 \times 10^{-5}$/° C. to $+10^{-5}$/° C.

* * * * *